Oct. 2, 1923.

G. L. LUKENS 1,469,655

STEERING WHEEL LOCK

Filed Dec. 20, 1921

Gabriel L. Lukens, INVENTOR.

BY Geo. P. Kimmel ATTORNEY.

Patented Oct. 2, 1923.

1,469,655

UNITED STATES PATENT OFFICE.

GABRIEL L. LUKENS, OF DECATUR, ILLINOIS, ASSIGNOR TO JOHN MOISTER, OF DE LAND, ILLINOIS.

STEERING-WHEEL LOCK.

Application filed December 20, 1921. Serial No. 523,679.

*To all whom it may concern:*

Be it known that I, GABRIEL L. LUKENS, a citizen of the United States, residing at Decatur, in the county of Macon and State of Illinois, have invented certain new and useful Improvements in Steering-Wheel Locks, of which the following is a specification.

This invention relates to steering wheel locks for motor vehicles.

The object of the invention is to provide a lock of this character embodying extreme simplicity with maximum efficiency and which when in operative position prevents all possibility of the wheel being turned and the vehicle steered thereby avoiding theft of the vehicle.

Another object is to provide a device of this character which may be easily applied to a steering post tube and when applied cannot be removed without the use of the tools of a mechanic.

With these and other objects in view, the invention consists in certain novel features of construction as hereinafter shown, described and claimed.

In the accompanying drawing:—

In the embodiment illustrated the lock constituting this invention is shown mounted on the tube T of an automobile steering post near its upper end adjacent the wheel W.

Figure 1:
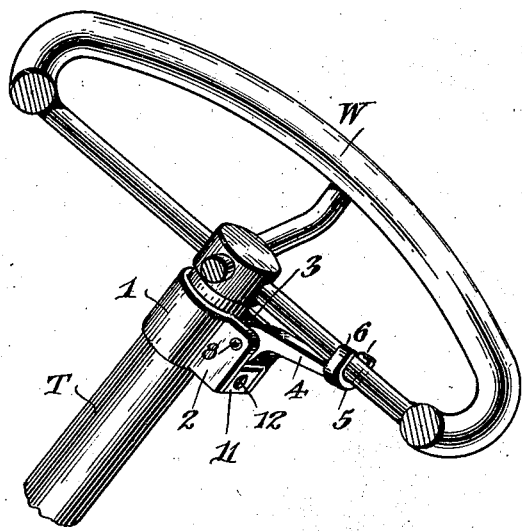
Figure 1 represents a perspective view of a steering wheel and a portion of its post with this improved lock shown applied.

The wheel locking attachment comprises a longitudinally split collar or sleeve 1 of metal sufficiently strong to resist attempts made to remove it from the tube T. This sleeve 1 is designed to snugly fit said tube and is provided at its split edge with laterally extending plates 2 and 3 preferably formed integral therewith and between which is pivotally mounted a heavy metal arm or bar 4 having a bifurcated head 5 at its outer end the furcations 6 of which extend laterally upward at right angles from said bar and are spaced apart a distance to receive between them one of the spokes S of the wheel W when in operative position as is shown clearly in Fig. 1. The inner pivoted end of the bar 4 has an enlarged head 7 which is disposed between the plates 2 and 3 and through which and said plates the pivot bolt 8 extends. This bolt 8 after it is passed through these parts has the end opposite the head thereof upset to prevent its removal.

The head 7 is provided at the lower portion of its periphery with a plurality of ratchet teeth 9, three being here shown and which are designed to be interlockingly engaged by a pawl in the form of a lock bolt 10 when the arm 4 is swung upward into operative engagement with the steering wheel spoke S which bolt reliably holds said arm in this position and prevents all possibility of its being released from the wheel.

Figure 2:
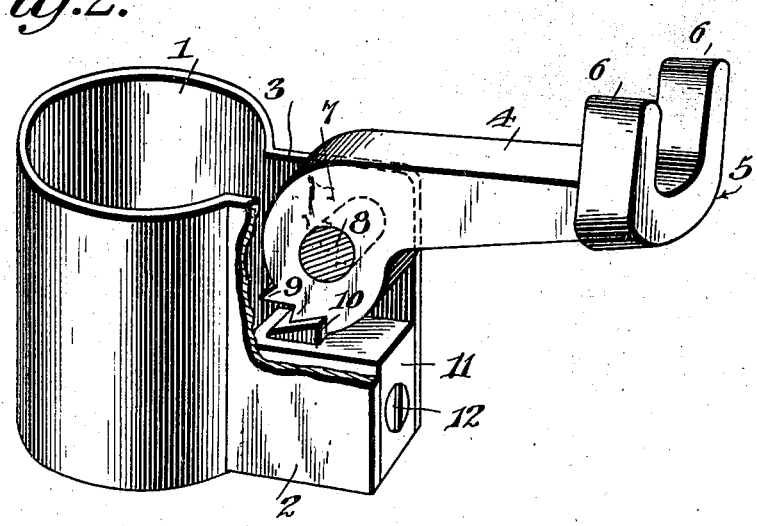
Fig. 2 is an enlarged perspective view of the attachment detached with parts broken out and in section.

The lock 11 which carries the bolt 10 is mounted between the plates 2 and 3 at the end opposite that in which the head 7 of the bar 4 is mounted as is shown clearly in Fig. 2 and fixed tightly between said plates being secured therein by any suitable means. This lock 11 may be of any suitable construction the bolt 10 thereof being beveled at its outer end to cooperate with the teeth 9 on head 7 and said bolt is key-actuated a key not shown being insertable in the opening 12 for releasing the bolt 10 from the teeth 9 when it is desired to lower the bar 4 out of locking engagement with the wheel. The beveled formation of the lock end 10 and the shape of the teeth 9 permits the arm 4 to be swung upward into operative position and locked by bolt 10 when it is desired to lock the steering wheel without necessitating insertion of the key the bolt 10 being spring projected as is common with devices of this character. It will thus be seen that the key is only necessary to retract the bolt when it is desired to unlock the device from the steering wheel.

From the above description it will be seen that while this device is extremely simple in construction and capable of being cheaply manufactured it will be thoroughly effective for locking the steering wheel W against turning when the arm 4 is swung upward into engagement with the spoke of said wheel and that it can only be released by an authorized person having a key for retracting the bolt 10 which when retracted permits the arm 4 to drop down by gravity out of engagement with the wheel and which will so remain out of the way of the driver until required again for use.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:—

A device for the purpose set forth comprising a combined coupling and supporting element including a curved split body adapted to be connected to a steering column below a steering wheel and having projecting therefrom a pair of laterally extending spaced parallel rectangular plates, a pivot having its ends mounted in said plates at the upper portion thereof and spaced from said body, a circular head shiftably mounted on said pivot and having the lower part of its edge formed with a plurality of teeth, an arm integral with the upper portion of the head and projecting outwardly from said plates and having its outer terminus provided with an upwardly extending yoke-shaped head for the reception of a spoke of a steering wheel to lock the latter, and a key operated locking mechanism secured between the lower portions of said plates and including a normally projected spring controlled latch element engageable with any one of the said teeth for locking said arm to prevent the lowering of the yoke to release the steering wheel.

In testimony whereof, I affix my signature hereto.

GABRIEL L. LUKENS.

Witness:
C. F. Evans.